United States Patent Office 3,166,559
Patented Jan. 19, 1965

3,166,559
3-LOWER ALKOXY-4-PHENYLOXY-14-HYDROXY-N-METHYLMORPHINANS
Yoshiro Sawa and Shin Maeda, Hyogo Prefecture, and Naoki Tsuzi, Osaka Prefecture, Japan, assignors to Shionogi & Co., Ltd., Osaka, Japan
No Drawing. Filed Apr. 4, 1963, Ser. No. 270,555
Claims priority, application Japan, Apr. 9, 1962, 37/14,252
2 Claims. (Cl. 260—285)

The present invention relates to a process for hydrogenating unsaturated morphinans and the saturated morphinans produced thereby.

In the term "morphinan" herein employed, there are included all the compounds having a fundamental structure representable by the following plane formula:

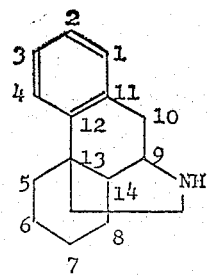

Accordingly, the term "morphinan" means not only normal morphinan (cis-1,3,4,9,10,10a-hexahydro-2H-10,4a-iminoethanophenanthrene) but also isomorphinan (trans-1,3,4,9,10,10a-hexahydro - 2H - 10,4a - iminoethanophenanthrene), inclusively. When distinction is necessary, normal morphinan and isomorphinan will be hereinafter designated as "morphinan (cis)" and "morphinan (trans)," respectively. The position-numbering hereinafter employed for the morphinan derivatives is that generally accepted in morphinan chemistry as shown in the above plane formula.

The hydrogenation process of the present invention is illustratively represented by the following formulae:

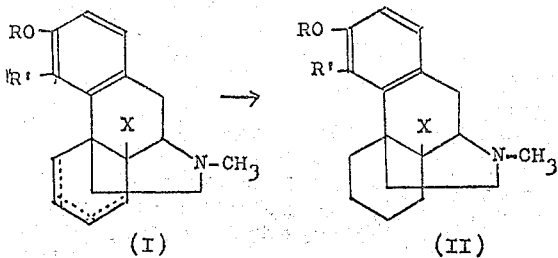

wherein R represents a hydrogen atom or a lower alkyl group (e.g. methyl, ethyl, propyl), R' represents a hydrogen atom, an aryloxy group (e.g. phenyloxy, naphthyloxy) or a subsituted aryloxy group (e.g. substituted phenyloxy, substituted naphthyloxy) wherein the substituent is lower alkyl (e.g. methyl, ethyl, propyl), lower alkoxy (e.g. methoxy, ethoxy, propoxy), nitro or amino, X represents a hydrogen atom or a hydroxyl group and, in Formula I, one or two double bond(s) exist(s) in the C ring.

As the starting material, there may be used the optically active or racemic unsaturated morphinan of Formula I which includes, for instance, 3-hydroxy-N-methyl-$\Delta^5$-morphinan, 3-hydroxy-N-methyl-$\Delta^6$-morphinan, 3-hydroxy-N-methyl-$\Delta^7$-morphinan, 3,14-dihydroxy-N-methyl-$\Delta^6$-morphinan, 3,14-dihydroxy-N-methyl-$\Delta^{5,7}$-morphinan, 3-methoxy-N-methyl-$\Delta^5$-morphinan, 3-methoxy-N-methyl-$\Delta^6$-morphinan, 3-methoxy - N - methyl-$\Delta^7$-morphinan, 3-methoxy-14-hydroxy-N-methyl-$\Delta^5$-morphinan, 3-ethoxy-N-methyl-$\Delta^6$-morphinan, 3-methoxy-4-phenyloxy-N-methyl-$\Delta^6$-morphinan, 3-methoxy-4-phenyloxy-14-hydroxy-N-methyl-$\Delta^5$-morphinan, etc.

According to the process of the present invention, the starting unsaturated morphinan (I) is subjected to hydrogenation to produce the saturated morphinan of Formula II. Although various conventional hydrogenation procedures can be adopted for attaining the object, the application of catalytic hydrogenation is preferred. For instance, the hydrogenation reaction may be effected by treating the unsaturated morphinan (I) with hydrogen in the presence of a catalyst such as platinum catalyst (e.g. platinum, platinum dioxide, platinum black, platinum-carbon), palladium catalyst (e.g. palladium, palladium monoxide, palladium black, palladium carbon, palladium-strontium carbonate, palladium-barium sulfate) and nickel catalyst (e.g. Raney nickel, Urushibara nickel) in an inert solvent medium (e.g. water, methanol, ethanol, ether, tetrahydrofuran, dioxane, benzene, acetic acid), usually at room temperature (15 to 30° C.) under atmospheric pressure.

The saturated morphinan (II) occurs in optically active form as well as in racemic mixture and these are all within the scope of the present invention. Specific examples of the saturated morphinan (II) include 3-hydroxy-N-methylmorphinan, 3,14-dihydroxy-N-methylmorphinan, 3-methoxy-N-methylmorphinan, 3-methoxy-14-hydroxy-N-methylmorphinan, 3-ethoxy-N-methylmorphinan, 3-methoxy-4-phenyloxy-N-methylmorphinan, 3-methoxy-4-phenyloxy-14-hydroxy-N-methylmorphinan, etc.

The saturated morphinan (II) forms acid addition salts with organic and inorganic acids. Illustrative acid addition salts include the hydrohalide (e.g. hydrochloride, hydrobromide, hydroiodide), sulfate, phosphate, nitrate, tartrate, salicylate, benzoate, malate, citrate, acetate, etc.

The saturated morphinan (II) and acid addition salts thereof exhibit various pharmacological activity such as analgesic activity and antitussive activity. For instance, the analgesic activity, antitussive activity and toxicity of some compounds according to the present invention are shown in the following table:

TABLE

| Compound | Analgesic activity | Antitussive activity | Toxicity (LD$_{50}$, mg./kg.) |
|---|---|---|---|
| (+)-3-Hydroxy-N-methyl-morphinan (cis) | 0.1 | 1.2 | 62.1 |
| (−)-3-Hydroxy-N-methyl-morphinan (cis) | 3.9 | 7.0 | 23.4 |
| (±)-3-Hydroxy-N-methyl-morphinan (cis) | 2.9 | 3.8 | 51.0 |
| (+)-3-Hydroxy-N-methyl-morphinan (trans) | | 2.0 | 25.0 |
| (−)-3-Hydroxy-N-methyl-morphinan (trans) | 2.8 | | 31.3 |
| (+)-3-Methoxy-N-methyl morphinan (cis) hydrobromide | | 1.1 | 51.5 |
| (−)-3-Methoxy-N-methyl-morphinan (cis) hydrobromide | 0.6 | 2.5 | 42.3 |
| (±)-3-Methoxy-N-methyl-morphinan (cis) hydrobromide | 0.6 | 2.4 | 45.7 |
| (−)-3-Ethoxy-N-methyl-morphinan (cis) phosphate | 0.6 | 2.5 | 52.6 |
| (−)-3,14-Dihydroxy-N-methyl-morphinan (cis) | 1.5 | 3.8 | 63.7 |
| (−)-3-Methoxy-14-hydroxy-N-methylmorphinan (cis) | 0.5 | 3.4 | 43.1 |

NOTE.—The analgesic activity was observed by the Haffner-Hesse method [Hesse: Arch. exp. Path. u. Pharm., vol. 158, p. 233 (1930)] in mice and is shown as the effective ratio to morphine, the value of which is expressed as 1. The antitussive activity was observed by the Winter method [Winter et al.: J. Exper. Med., vol. 101, p. 17 (1955)] in guinea pigs and is shown as the effective ratio to codeine, the value of which is expressed as 1. The toxicity was tested by intravenous administration of the tested compound to mice.

Other saturated morphinans (II) show the similar activities. Accordingly, they are useful as analgesic and/or antitussive agents.

Practical and presently preferred embodiments of the present invention are illustrated by the following examples. In the examples, mg.=milligram(s), g.=gram(s), ml.= millilitre(s) and °C.=degrees centigrade. Other abbreviations have conventional meanings.

*Example 1*

Preparation of (—)-3-methoxy-N-methylmorphinan (cis):

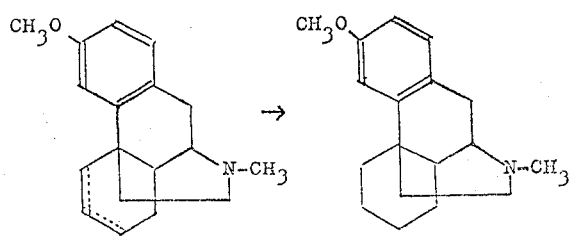

To a solution of a mixture of (—)-3-methoxy-N-methyl-Δ⁵-morphinan (cis) and (—)-3-methoxy-N-methyl-Δ⁶-morphinan (cis) (200 mg.) in methanol (18 ml.), there is added platinum dioxide (70 mg.), and the resultant mixture is shaken at room temperature (15 to 30° C.) in hydrogen stream. After absorption of hydrogen (31 ml.), the reaction mixture is filtered to separate the catalyst and distilled to remove the solvent. The residue (203 mg.) is crystallized from ether to give (—)-3-methoxy-N-methylmorphinan (cis) as crystals melting at 108 to 110° C.

The starting material of this example, (—)-3-methoxy-N-methyl-Δ⁵ or ⁶-morphinan (cis), is prepared from desoxydihydrothebainone [Sawa et al.: Tethahedron, vol. 15, p. 154 (1961)] according to the following scheme:

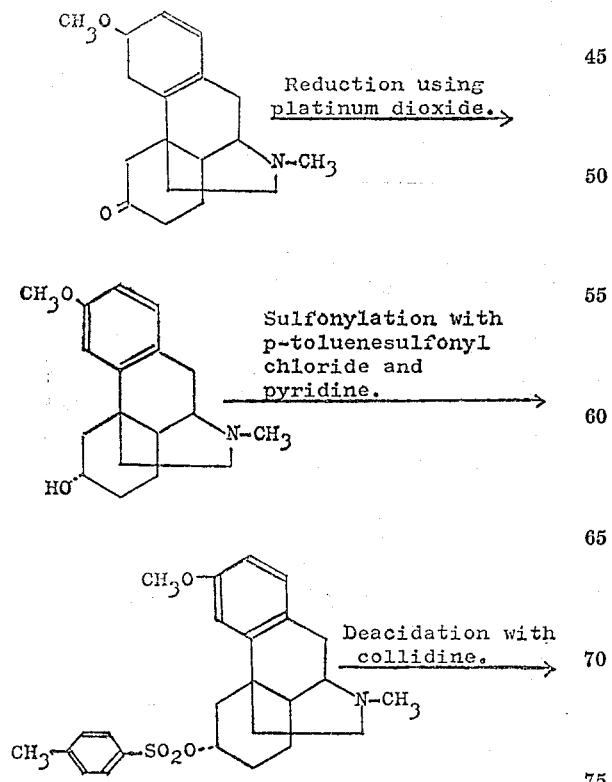

*Example 2*

Preparation of (—)-3-methoxy-N-methylmorphinan (trans):

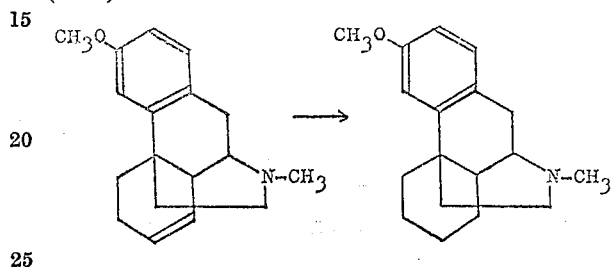

To a solution of (—)-3-methoxy-N-methyl-Δ⁷-morphinan (trans) (98 mg.) in methanol (10 ml.), there is added platinum dioxide (30 mg.), and the resultant mixture is shaken at room temperature (15 to 30° C.) in hydrogen stream. After absorption of hydrogen (7.2 ml.), the reaction mixture is filtered to separate the catalyst and distilled to remove the solvent. The thus obtained crude (—)-3-methoxy-N-methylmorphinan (trans) (92 mg.) is treated with picric acid in ethanol and crystallized from ethanol to give (—)-3-methoxy-N-methylmorphinan (trans) picrate as crystals melting at 212 to 213° C.

*Analysis.*—Calcd. for $C_{18}H_{25}ON \cdot C_6H_3O_7N_3$: C, 57.54; H, 5.63; N, 11.19. Found: C, 57.55; H, 5.93; N, 11.53.

The starting material of this example, (—)-3-methoxy-N-methyl-Δ⁷-morphinan (trans), is prepared from (—)-3,6-dimethoxy-N-methyl-Δ⁵,⁸-morphinan (cis) [Sawa et al.: Tetrahedron, vol. 15, p. 154 (1961)] according to the following scheme:

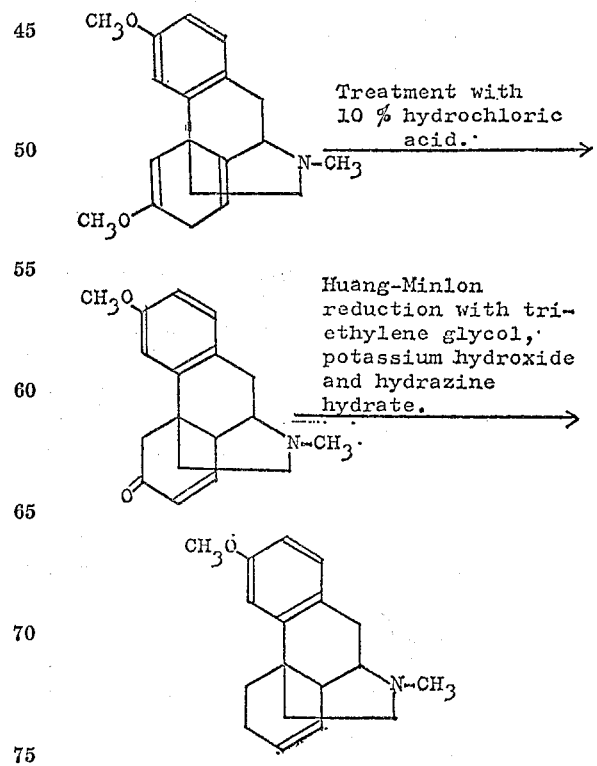

Example 3

Preparation of (−)-3-methoxy-N-methylmorphinan (cis):

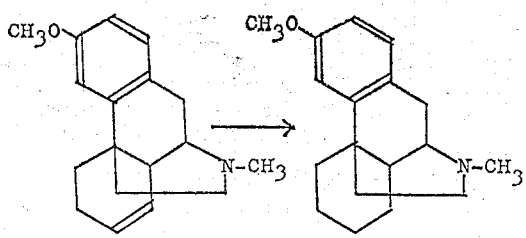

To a solution of (−)-3-methoxy-N-methyl-Δ⁷-morphinan (cis) (96 mg.) in methanol (10 ml.), there is added platinum dioxide (30 mg.), and the resultant mixture is shaken at room temperature (15 to 30° C.) in hydrogen stream. After absorption of hydrogen (6.5 ml.), the reaction mixture is filtered to separate the catalyst and distilled to remove the solvent. The residue is crystallized from ether to give (−)-3-methoxy-N-methylmorphinan (cis) (93 mg.) as crystals melting at 107.5 to 109° C.

The starting material of this example, (−)-3-methoxy-N-methyl-Δ⁷-morphinan (cis), is prepared from (−)-3-methoxy-6-oxo-N-methyl-Δ⁷-morphinan (cis) [cf. Example 2 of this specification] according to the following scheme:

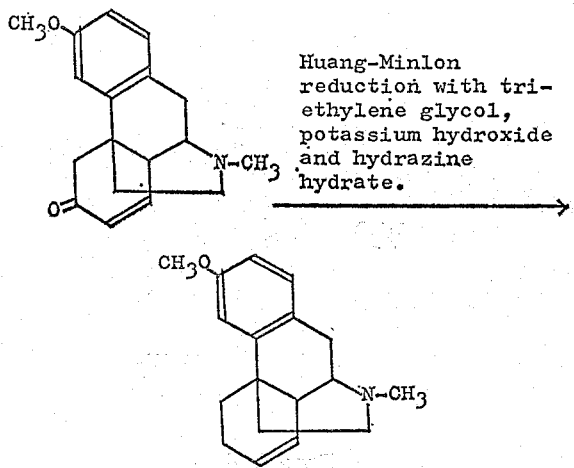

Example 4

Preparation of (+)-3-methoxy-4-phenyloxy-N-methylmorphinan (cis):

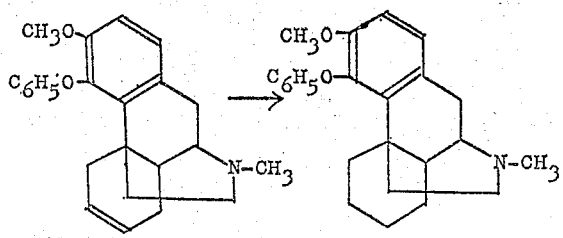

To a solution of (+)-3-methoxy-4-phenyloxy-N-methyl-Δ⁶-morphinan (cis) (1.2 g.) in glacial acetic acid (50 ml.), there is added platinum dioxide (50 mg.), and the resultant mixture is shaken at room temperature (15 to 30° C.) in hydrogen stream. After absorption of hydrogen (62 ml.), the reaction mixture is filtered to separate the catalyst and distilled to remove the solvent. The residue (1.2 g.) is crystallized from petroleum ether to give (+)-3-methoxy-4-phenyloxy-N-methylmorphinan (cis) as crystals melting at 95 to 96° C. $[\alpha]_D^{21}$ +9.5° (ethanol).

*Analysis.*—Calcd. for $C_{24}H_{29}O_2N$: C, 79.30; H, 8.04; N, 3.85. Found: C, 79.29; H, 8.06; N, 3.76.

The starting material of this example, (+)-3-methoxy-4-phenyloxy-N-methyl-Δ⁶-morphinan (cis), is prepared from sinomenine phenyl ether [Sawa et al.: Tetrahedron, vol. 15, p. 144 (1961)] according to the following scheme:

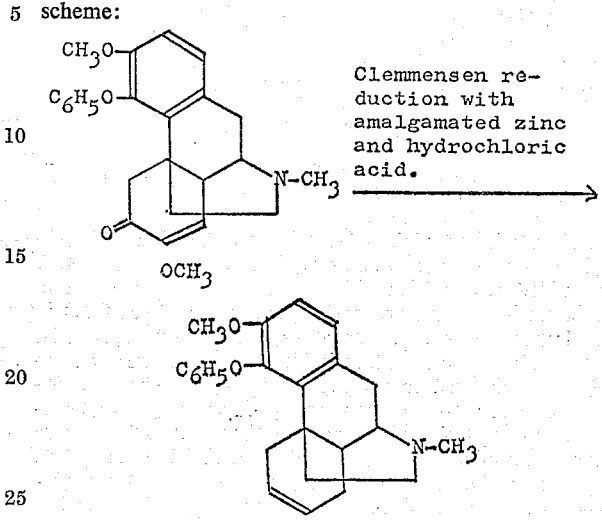

Example 5

Preparation of (+)-3-methoxy-N-methylmorphinan (cis):

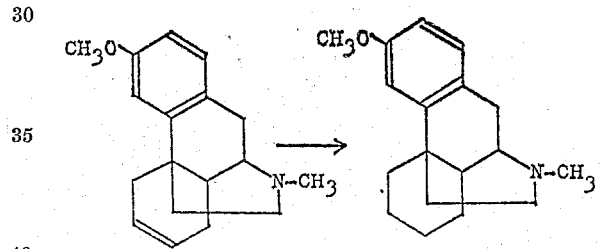

To a solution of (+)-3-methoxy-N-methyl-Δ⁶-morphinan (cis) (180 mg.) in glacial acetic acid (6 ml.), there is added platinum dioxide (10 mg.), and the resultant mixture is shaken at room temperature (15 to 30° C.) in hydrogen stream. After absorption of hydrogen (18 ml.), the reaction mixture is filtered to separate the catalyst and distilled to remove the solvent. The residue (180 mg.) is crystallized from petroleum ether to give (+)-3-methoxy-N-methylmorphinan (cis) as crystals melting at 105 to 108° C.

The starting material of this example, (+)-3-methoxy-N-methyl-Δ⁶-morphinan (cis), is prepared from desoxysinomenine [Sawa et al.: Tetrahedron, vol. 15, p. 144 (1961)] according to the following scheme:

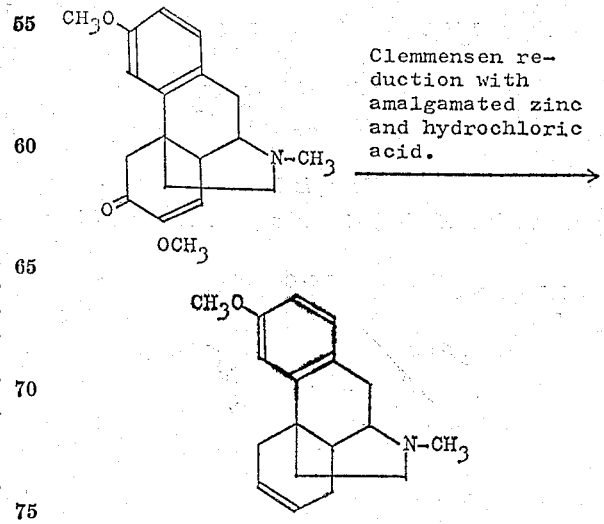

Example 6

Preparation of (—)-3-methoxy-4-phenyloxy-N-methyl-morphinan (cis):

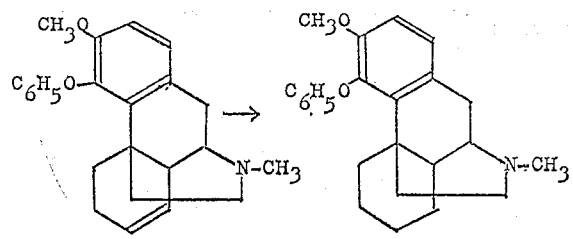

To a solution of (—)-3-methoxy-4-phenyloxy-N-methyl-Δ⁷-morphinan (cis) (28 mg.) in ethanol (10 ml.), there is added platinum dioxide (15 mg.), and the resultant mixture is shaken at room temperature (15 to 30° C.) in hydrogen stream. After absorption of hydrogen (4.4 ml.), the reaction mixture is filtered to separate the catalyst and distilled to remove the solvent. The thus obtained crude (—)-3-methoxy-4-phenyloxy-N-methylmorphinan (cis) (24 mg.) is treated with methyl iodide to give the methiodide as crystals melting at 236.5 to 237.5° C.

The starting material of this example, (—)-3-methoxy-4-phenyloxy-N-methyl-Δ⁷-morphinan (cis), is prepared from (—) - 3,6 - dimethoxy-4-phenyloxy-N-methyl-Δ$^{5,8}$-morphinan (cis) [Sawa et al.: Tetrahedron, vol. 15, p. 154 (1961)] according to the following scheme:

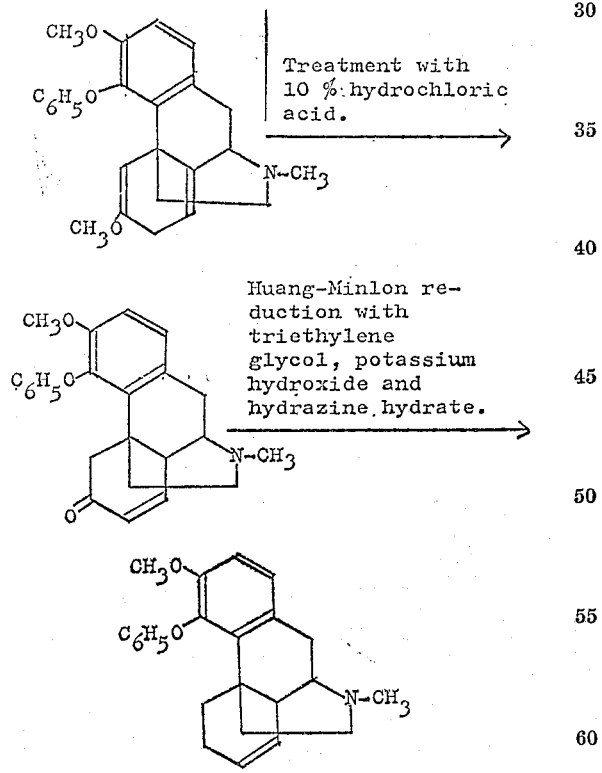

Example 7

Preparation of (—) - 3-methoxy-N-methylmorphinan (cis):

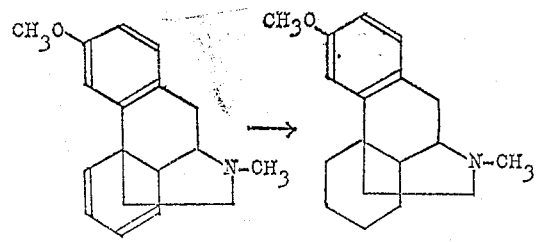

To a solution of (—)-3-methoxy-N-methyl-Δ$^{5,7}$-morphinan (cis) (50 mg.) in ethanol (15 ml.), there is added platinum dioxide (30 mg.), and the resultant mixture is shaken at room temperature (15 to 30° C.) in hydrogen stream. After absorption of hydrogen (9.8 ml.), the reaction mixture is evaporated to remove the solvent. The residue is dissolved in ether and filtered to separate the insoluble catalyst. The filtrate is evaporated and crystallized from ethanol to give (—)-3-methoxy-N-methyl-morphinan (cis) (48 mg.) as crystals melting at 108 to 109° C.

The starting material of this example, (—)-3-methoxy-N-methyl-Δ$^{5,7}$-morphinan (cis), is prepared from (—)-3-methoxy-6-oxo-N-methyl-Δ⁷-morphinan (cis) [cf. Example 2 of this specification] according to the following scheme:

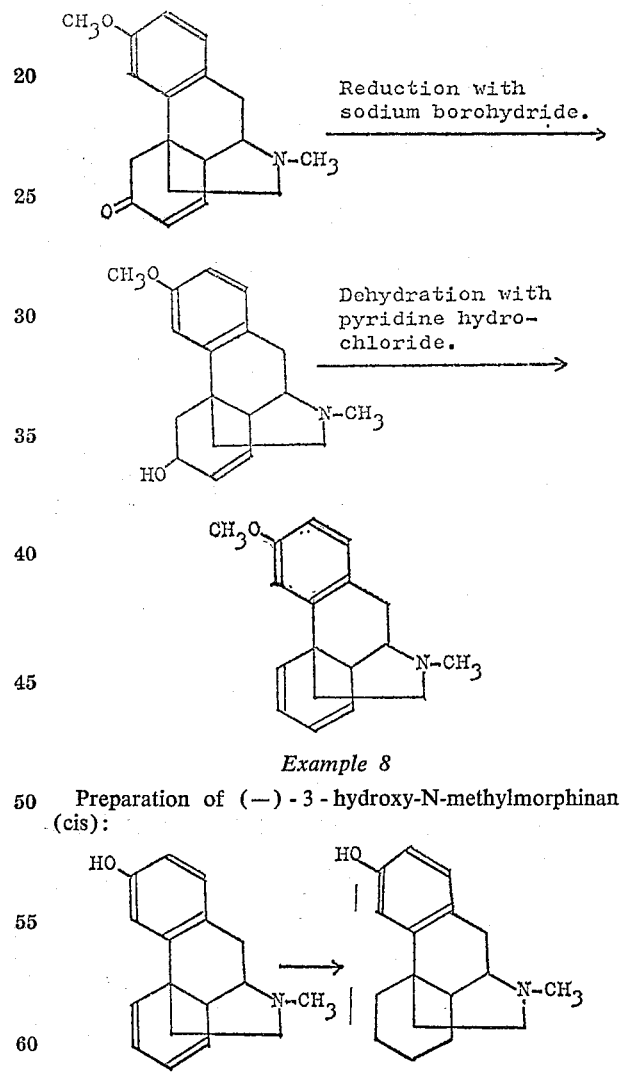

Example 8

Preparation of (—) - 3 - hydroxy-N-methylmorphinan (cis):

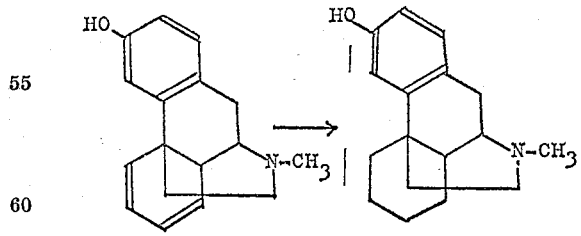

To a solution of (—)-3-hydroxy-N-methyl-Δ$^{5,7}$-morphinan (cis) (100 mg.) in ethanol (10 ml.), there is added platinum dioxide (30 mg.), and the resultant mixture is shaken at room temperature (15 to 30° C.) in hydrogen stream. After absorption of hydrogen (27.5 ml.), the reaction mixture is filtered to separate the catalyst and distilled to remove the solvent. The residue is crsytallized from tert. amyl alcohol to give (—)-3-hydroxy-N-methyl-morphinan (cis) (41 mg.) as crystals melting at 198 to 199° C.

The starting material of this example, (—)-3-hydroxy-N-methyl-Δ$^{5,7}$-morphinan (cis), is prepared from (—)-3-methoxy - 6 - oxo-N-methyl-Δ⁷-morphinan (cis) [cf. Example 2 of this specification] according to the following scheme:

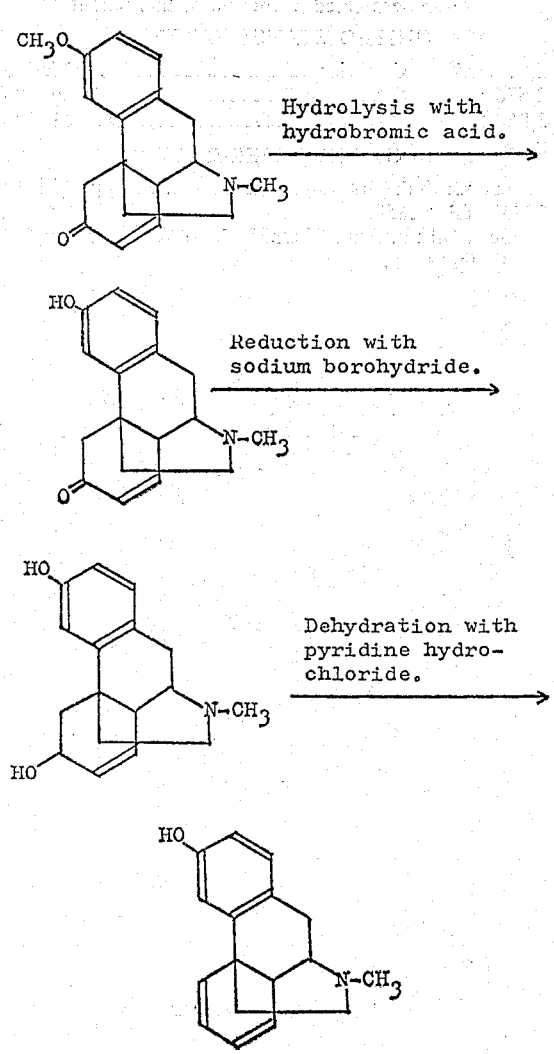

*Example 9*

Preparation of (—)-3-methoxy - N - methylmorphinan (trans):

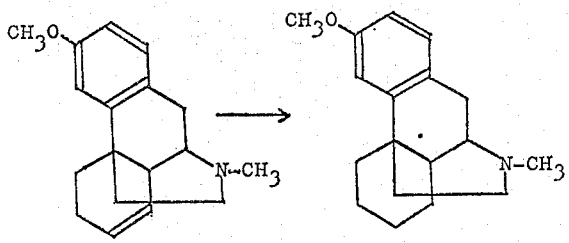

To a solution of (—)-3-methoxy - N - methyl-Δ⁷-morphinan (trans) (98 mg.) in methanol (10 ml.), there is added platinum dioxide (30 mg.), and the resultant mixture is shaken at room temperature (15 to 30° C.) in hydrogen stream. After absorption of hydrogen (7.2 ml.), the reaction mixture is filtered to separate the catalyst and distilled to remove the solvent. The thus-obtained crude (—)-3-methoxy - N - methylmorphinan (trans) (92 mg.) is treated with picric acid in ethanol and crystallized from ethanol to give the picrate as crystals melting at 212 to 213° C.

*Analysis.*—Calcd. for $C_{18}H_{25}ON \cdot C_6H_3O_7N_3$: C, 57.54; H, 5.63; N, 11.19. Found: C, 57.55; H, 5.93; N, 11.53.

The starting material of this example, (—)-3-methoxy-N-methyl-Δ⁷-morphinan (trans), is prepared from (—)-3-methoxy-6-oxo - N - methyl-Δ⁷-morphinan (cis) [cf. Example 2 of this specification] according to the following scheme:

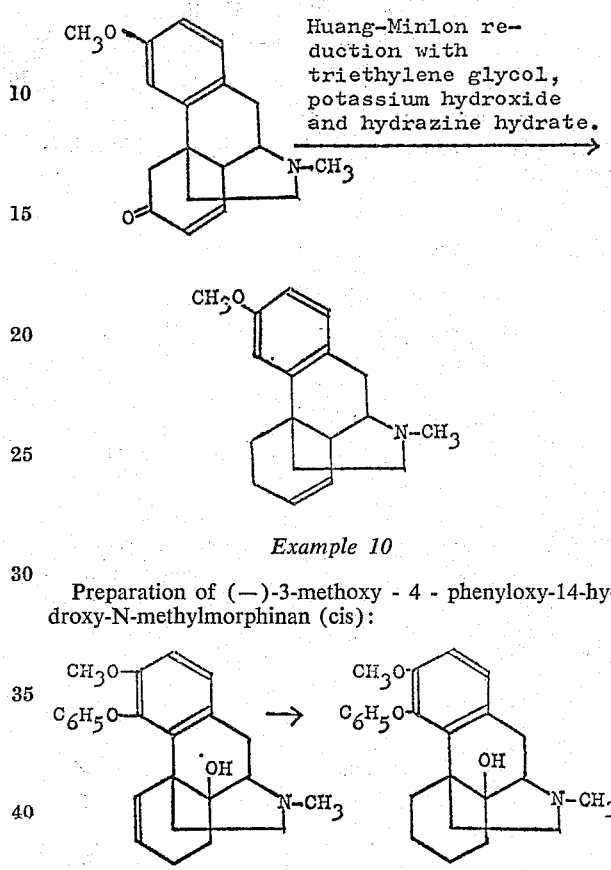

*Example 10*

Preparation of (—)-3-methoxy - 4 - phenyloxy-14-hydroxy-N-methylmorphinan (cis):

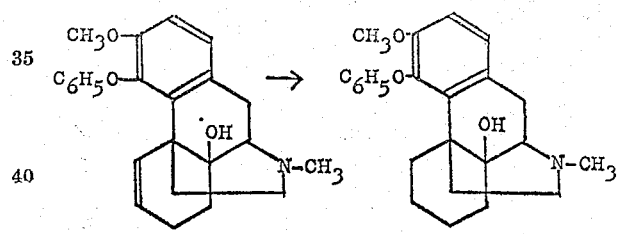

To a solution of (—)-3-methoxy-4-phenyloxy-14-hydroxy-N-methyl - Δ⁵ - morphinan (cis) (300 mg.) in 10% acetic acid (6 ml.), there is added platinum dioxide (15 mg.), and the resultant mixture is shaken at room temperature (15 to 30° C.) in hydrogen stream. After absorption of hydrogen (25 ml.), the reaction mixture is filtered to separate the catalyst. The filtrate is neutralized with ammonia-water and shaken with dichloromethane. The dichloromethane layer is evaporated and the residue crystallized from ethanol to give (—)-3-methoxy-4-phenyloxy-14-hydroxy-N-methylmorphinan (cis) (301 mg.) as crystals melting at 112 to 113° C. $[\alpha]_D^{24}$ —29.4° (chloroform).

*Analysis.*—Calcd. for $C_{24}H_{29}O_3N$: C, 75.96; H, 7.70; N, 3.69. Found C, 75.88; H, 8.05; N, 3.56.

The starting material of this example, (—)-3-methoxy-4-phenyloxy - 14 - hydroxy-N-methyl-Δ⁵-morphinan (cis), is prepared from (—)-3-methoxy - 4,14 - dihydroxy-N-methyl - Δ⁵ - morphinan (cis) [Seki: Annual Report of Takamine Research Laboratory, vol. 13, p. 67 (1961)] according to the following scheme:

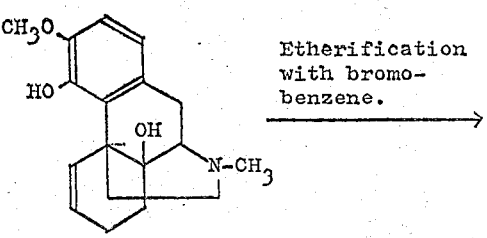

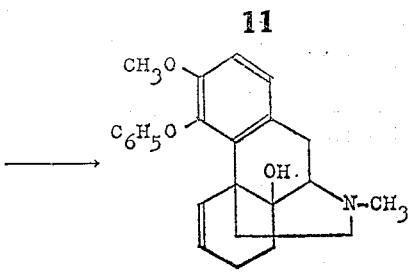
What is claimed is:
1. 3 - lower alkoxy-4-phenyloxy-14-hydroxy-N-methylmorphinan.
2. (—)-3-methoxy - 4 - phenyloxy-14-hydroxy-N-methylmorphinan (cis).
References Cited in the file of this patent
UNITED STATES PATENTS
| | | |
|---|---|---|
| 2,619,485 | Chabrier | Nov. 25, 1952 |
| 2,676,177 | Schnider et al. | Apr. 20, 1954 |
| 3,068,234 | Brown | Dec. 11, 1962 |
OTHER REFERENCES
Hartung: Ind. and Eng. Chem., vol. 37, pp. 126–127 (1945) TP 1 A58.
Gates et al.: J. Am.. Chem. Soc. vol 80, pp. 1186–1194 (1958), QD 1 A5.